United States Patent [19]

Yoneda

[11] Patent Number: 5,404,495

[45] Date of Patent: Apr. 4, 1995

[54] MICROCOMPUTER HAVING AN ERROR-CORRECTING FUNCTION BASED ON A DETECTED PARITY ERROR

[75] Inventor: Hiroshi Yoneda, Yokohama, Japan

[73] Assignee: Matsushita Electric Industrial Co., Ltd., Osaka, Japan

[21] Appl. No.: 788,884

[22] Filed: Nov. 7, 1991

[30] Foreign Application Priority Data

Nov. 2, 1990 [JP] Japan ................................ 2-317292

[51] Int. Cl.$^6$ ..................... G06F 11/10; G06F 11/34; G06F 11/00; H03M 13/00
[52] U.S. Cl. ................................. 395/575; 371/51.1; 371/50.1; 371/37.4; 371/40.4; 371/21.5
[58] Field of Search .................. 371/21.5, 40.4, 40.1, 371/50.1, 37.4, 51.1; 395/575

[56] References Cited

U.S. PATENT DOCUMENTS

| | | | |
|---|---|---|---|
| 3,851,306 | 11/1974 | Patel | 340/146.1 |
| 4,849,978 | 7/1989 | Dishon | 371/51 |
| 5,007,053 | 4/1991 | Iyer et al. | 371/21.1 |
| 5,043,943 | 8/1991 | Crisp et al. | 365/189.1 |
| 5,130,992 | 7/1992 | Frey, Jr. et al. | 371/40.1 |
| 5,191,584 | 3/1993 | Anderson | 371/51.1 |
| 5,235,601 | 8/1993 | Stallmo et al. | 371/40.1 |

FOREIGN PATENT DOCUMENTS

| | | |
|---|---|---|
| 62-24716 | 2/1987 | Japan . |
| 62-245725 | 10/1987 | Japan . |
| 1-186020 | 7/1989 | Japan . |

OTHER PUBLICATIONS

"Use of Non-volatile Semiconductor Storage for Disk Array Parity", Nov. 1990, p. 254, IBM Tech. Disc. Bulletin.

Dishon et al., "A Highly Available Storage System Using the Check Sum Method", Aug. 31, 1987, pp. 176-182, IEEE Computer Society.

Primary Examiner—Robert W. Beausoliel, Jr.
Assistant Examiner—Phillip Vales
Attorney, Agent, or Firm—Spencer, Frank & Schneider

[57] ABSTRACT

A microcomputer having an error correction function includes a summing function for calculating a total-sum of data associated with a block of stored data, a total-sum changing function for calculating a new total sum of data associated with the block of stored data when new data is stored in the block of stored data, the new total sum of data being based on an equation $S_{new} = S_{old} + X_{new} - X_{old}$, where, $X_{new}$ denotes new data replacing old data $X_{old}$, and $S_{old}$ denotes an old total sum of data associated with the block of stored data before the new data is stored, a parity adding function for calculating a vertical parity associated with the new data, a parity error detecting function for detecting error in the vertical parity, and an error correction function for correcting data stored at an address where an error has been detected by subtracting data stored at all addresses of the block of stored data other than the data stored at the address where the error has been detected from the new total sum of data associated with the block of stored data.

2 Claims, 4 Drawing Sheets

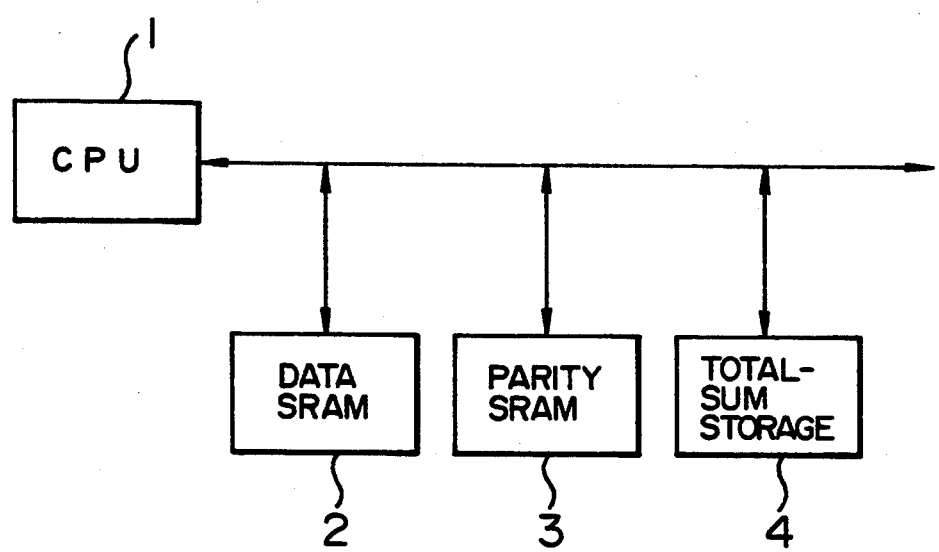
F I G. 1

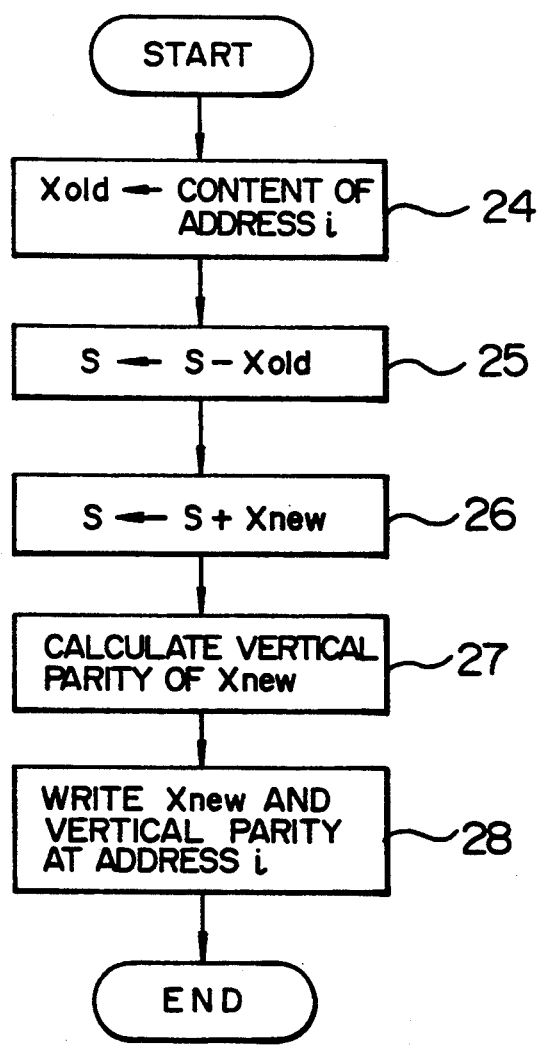
F I G. 4

MICROCOMPUTER HAVING AN ERROR-CORRECTING FUNCTION BASED ON A DETECTED PARITY ERROR

BACKGROUND OF THE INVENTION

The present invention relates to a microcomputer which is provided with an SRAM (static random access memory) and can store a large amount of data in the SRAM with certainty and at high speed, and more particularly relates to a microcomputer having an error-correcting function to improve reliability thereof.

An SRAM, which has low power consumption and is simple in circuit construction, has hitherto been used as a conventional memory of a microcomputer. In the SRAM, however, an unspecified bit is sometimes inverted by the influence of an α-ray or the like.

As a countermeasure for correcting such an error, various methods of detecting and correcting an error by the use of a microcomputer have been devised. For example, in one of the methods, a plurality of redundant bits for detecting and correcting an error are added to each address, and, in another method, parities of stored data in vertical and horizontal directions are provided and checked.

In the former method, however, it is necessary to store a plurality of redundant bits for detecting and correcting an error at every address. Accordingly, the former method has a drawback that an SRAM must have a storage capacity greater than that required to store information data. On the other hand, in the latter method, whenever it becomes necessary to rewrite data stored in an SRAM, all data in an associated block of the SRAM have to be read out in order to check a horizontal parity. Here, "an associated block" implies any arbitrarily chosen "associated" block which appears in the following description. Consequently, the latter method has a drawback that it takes a lot of time to rewrite data stored in the SRAM.

SUMMARY OF THE INVENTION

The present invention is intended to solve the above-mentioned problem, and an object of the present invention is to provide a microcomputer which uses only a single redundant bit at each address to detect and correct erroneous data and which is able to calculate data necessary for making error correction at high speed.

In order to attain the above object, the microcomputer of the present invention comprises a data SRAM for storing data, a parity SRAM for storing a vertical parity of data stored in the data SRAM, total-sum storage for storing a total sum of data in an associated block of each of the data SRAM and the parity SRAM, and a CPU (central processing unit) for controlling the operation of the data SRAM, the parity SRAM and the total-sum storage. Further, the CPU comprised in the microcomputer of the present invention has: a summing function of calculating a total sum of data in the associated block; a total-sum changing function of reading out data $X_{old}$ to be rewritten from the associated block before the data $X_{old}$ is rewritten and calculating a new total sum $S_{new}$ of data stored in the associated block after the data $X_{old}$ have been rewritten, on the basis of an equation $S_{new}=S_{old}+X_{new}-X_{old}$, where $X_{new}$ denotes rewritten data, and $S_{old}$ denotes a total sum of data stored in the associated block before the data $X_{old}$ is rewritten, thereby changing the total sum from $S_{old}$ to $S_{new}$; a parity adding function of calculating a vertical parity of data written in the data SRAM and writing the vertical parity in the parity SRAM; an error detecting function of reading out a vertical parity from the parity SRAM when data are read out from the data SRAM and sending out a warning when an error is detected in the vertical parity; and an error correcting function of subtracting data at all addresses other than an address where the error has been detected, from the new total sum $S_{new}$ thereby to obtain and correct data at the address where the error has been detected.

In the microcomputer of the present invention having the above-mentioned construction, a parity bit is provided at every address, and a total sum of data in an associated block of the SRAM is stored in the total-sum storage at the same time when data is written in the data SRAM. In this case, if an error is detected in the vertical parity of data written in the data SRAM, data at all addresses other than an address where the error has been detected are subtracted from a total sum of data in an associated block stored at present in the total sum storage to detect object data at the address where the error has been detected. Further, the calculation of the total-sum of data, when rewriting of data at a certain address is involved, can be performed at high speed by the use of data at the certain address before the rewriting is performed, data at the certain address after the rewriting has been performed, and a total sum of data in the associated block before the rewriting of data is performed.

The foregoing operation of calculation can be made either by the CPU using software or by hardware including suitable electronic circuits other than the CPU. In the case of utilizing suitable electronic circuits, however, writing and reading of data are performed by the CPU. After the reading has been performed, the operation of calculation is made automatically in both of the case of using software and the case of using hardware.

BRIEF DESCRIPTION OF THE DRAWINGS

FIG. 1 is a block diagram schematically showing the construction of a microcomputer of a first embodiment of the present invention.

FIGS. 2 to 4 show flow charts for explaining the operation of the microcomputer of the first embodiment.

DESCRIPTION OF THE PREFERRED EMBODIMENTS

Figure 2:
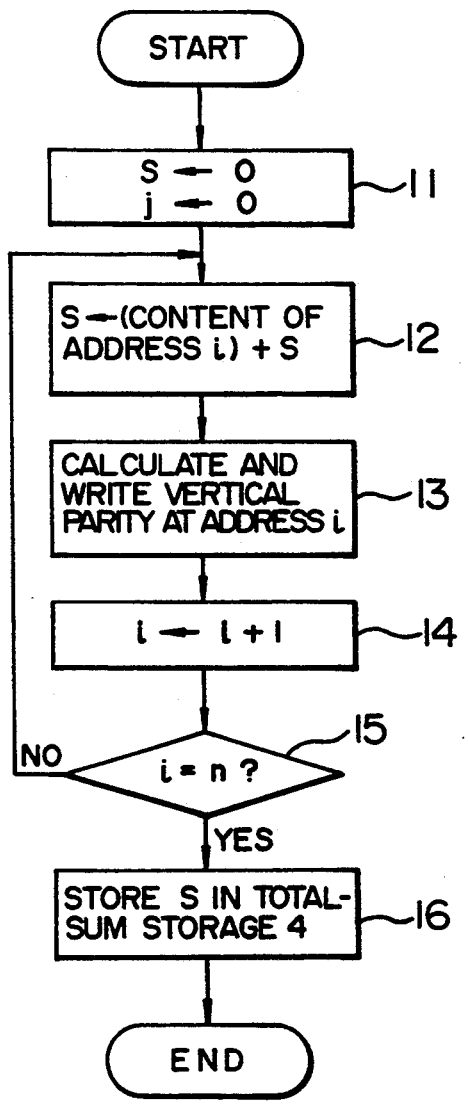

FIGS. 1 to 4 illustrates the construction and operation of a microcomputer of the first embodiment of the present invention.

In FIG. 1, reference numeral 1 designates a central processing unit CPU, 2 a data SRAM which makes it possible for the CPU 1 to write data therein and to read out data therefrom, 3 a parity SRAM in and from which a vertical parity of data stored in the data SRAM 2 can be written and read out, respectively, and 4 a total-sum storage capable of writing therein and reading therefrom a total sum of data in an associated block of each of the data SRAM 2 and the parity SRAM 3.

Further, the CPU 1 has: a summing function of calculating a total sum of data in the associated block; a total-sum changing function of reading out data $X_{old}$ to be rewritten from the associated block before the data $X_{old}$ is rewritten and calculating a new total sum $S_{new}$ of data stored in the associated block after the data $X_{old}$ have been rewritten, on the basis of an equation $S_{new} = S_{old} + X_{new} - X_{old}$, where $X_{new}$ denotes rewritten data, and $S_{old}$ denotes a total sum of data stored in the associated block before the data $X_{old}$ is rewritten, thereby changing the total sum from $S_{old}$ to $S_{new}$; a parity adding function of calculating a vertical parity of data written in the data SRAM 2 and writing the vertical parity in the parity SRAM 3; an error detecting function of reading out a vertical parity from the parity SRAM 3 when data are read out from the data SRAM 3 and sending out a warning when an error is detected in the vertical parity; and an error correcting function of subtracting data at all addresses other than new total sum $S_{new}$ thereby to obtain and correct data at an address where the error has been detected, from the address where the error has been detected.

Next, the operation of the present embodiment will be explained by making reference to FIGS. 2 to 4 with respect to the processing of data at addresses 0 to (n−1) in an associated block of each of the data SRAM 2 and the parity SRAM 3. At first, initialization is made as described hereunder at the time when a power supply switch in the present embodiment is turned on or in accordance with processing steps predetermined in the system in the present embodiment, and, at the same time, a processing for obtaining a total sum S of data in the associated block is performed.

Referring to FIG. 2, an initially set value of the total sum S and a value j of an address counter are both set to zero by the CPU 1 (step 11). Next, addition of the total sum S of data in the associated block to data at address i of the data SRAM 2 is performed (step 12). Then, a vertical parity of the data at address i is calculated, and the vertical parity thus obtained is written at address i of the parity SRAM 3 (step 13).

Thereafter, the value i in the address counter is incremented by one (step 14). Then, a decision is made as to whether the value i is equal to n or not (step 15). If the operation of obtaining the total sum S of data at addresses 0 to (n−1) in the associated block has not been completed, then the processing returns to step 12 and the processing of steps 12 to 15 is performed repeatedly. While, if it is decided that the total sum S of data at address 0 to (n−1) in the associated block has already been obtained, this total sum S is stored in the total-sum storage 4 (step 16), and the initialization ends.

At the same time as the calculation of the total sum S of data at addresses 0 to (n−1) in the associated block comes to an end, as described above, a vertical parity for each of the data at addresses 0 to (n−1) in the associated block is stored in the parity SRAM 3, and the total sum S of data at addresses 0 to (n−1) in the data SRAM 2 is stored in the total-sum storage 4.

Figure 3:
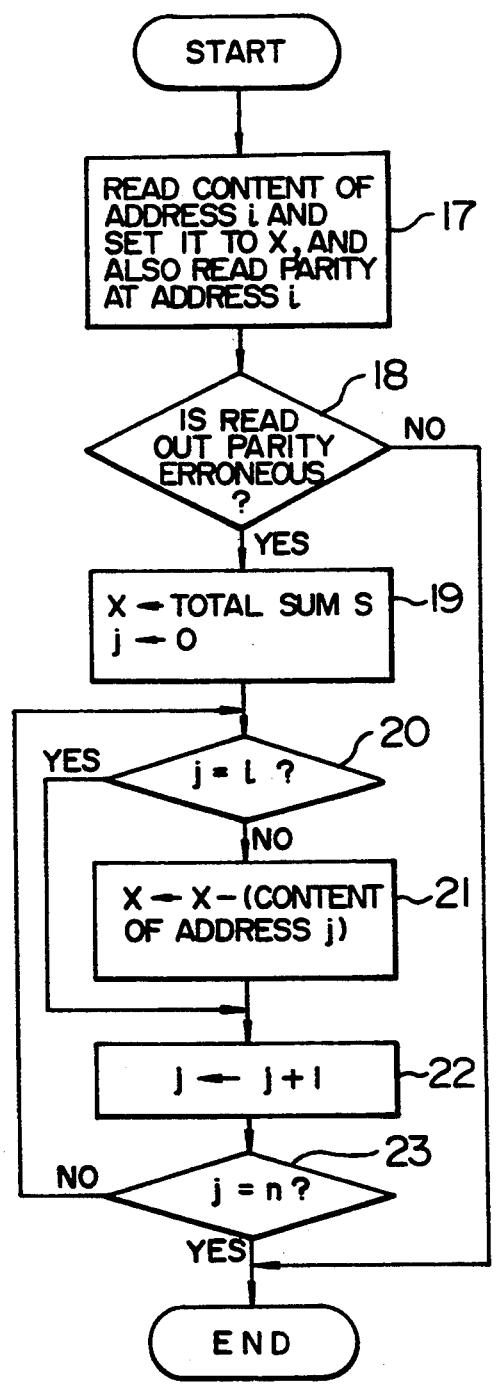

Each time the initialization according to the routine shown in FIG. 2 is completed, a normal operation is performed, and an error detection processing routine shown in FIG. 3 is started. In the processing of the routine shown in FIG. 3, in the first place, the content of address i in the data SRAM 2 is read out by the CPU and is set to X (step 17). At the same time, the content of address i in the parity SRAM 3 is read out. Then, a decision is made as to whether the read-out parity is erroneous or not (step 18). If the read-out parity is decided to be not erroneous, the error detection processing terminates, and X is treated as read-out data as it is.

While, if the read-out parity is decided to be erroneous, the following processing is carried out. That is, a total sum S is read out from the total-sum storage 4 and is set to X, and a value j of the address counter is set to zero (step 19). Then, a decision is made as to whether the value j of the address counter indicates the address i where the error has been detected (step 20). Only when the value j does not indicate the address i, data at address j is subtracted from X, and a resultant value X-j of the subtraction is set to X (step 21). Next, the value j of the address counter is incremented by one (step 22). Then, a decision is made as to whether the value j of the address counter has been incremented to reach address n (step 23). If the value j of the address counter has not reached address n, then the processing returns to step 20 and steps 20 to 22 are repeated. On the other hand, if the value j of the address counter has reached address n, the error detection processing is completed, and X is set as data at address i. As can be understood from the above description, a resultant value of X represents a value obtained by substracting data at all addresses other than address i from the total sum S. As a result, if any single bit of data at address i is erroneous and all data at other addresses and the total sum are correct, then the resultant value of X represents object data at the address i where the error has been detected in the corresponding vertical parity.

After the execution of the error detection processing routing shown in FIG. 3 has been completed, a data writing routine shown in FIG. 4 is executed. Referring to FIG. 4, in the first place, before data $X_{new}$ is written at address i in the data SRAM 2 by the CPU 1, data at address i is read out and used as old data $X_{old}$ (step 24). Then, the old data $X_{old}$ is subtracted from the total sum S stored in the total-sum storage 4 (step 25), and the data $X_{new}$ is added to a resultant value of the total sum S after the subtraction has been conducted to obtain a new value of S (step 26). Thus, the new value of S can be obtained by adding a difference $(X_{new} - X_{old})$ to the old value of S at the time when data $X_{new}$ is written at address i in the data SRAM 2, which implies that the new value of S can be obtained without summing up data at addresses 0 to (n−1) in the $X_{new}$ is calculated (step 27). Then, the vertical parity associated block. Thereafter, a vertical parity of data thus obtained and data $X_{new}$ are written at address i in the parity SRAM 3 and the data SRAM 2, respectively (step 28). Thus, this routine comes to an end.

Figure 5:
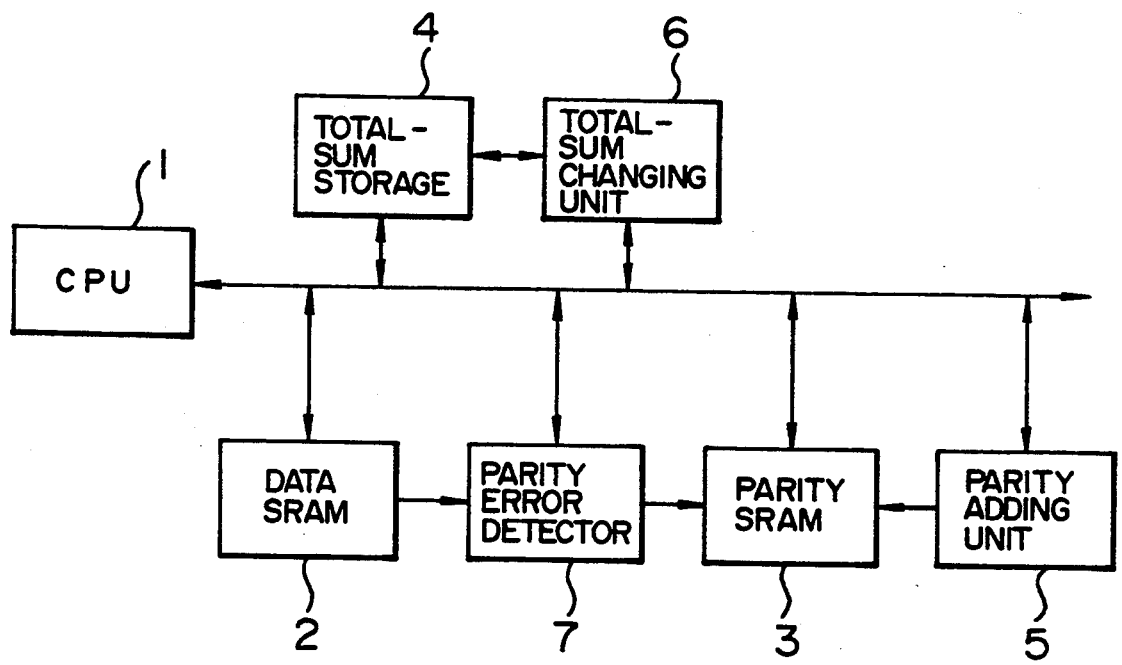
FIG. 5 is a block diagram schematically showing the construction of a microcomputer of a second embodiment of the present invention.

FIG. 5 is a block diagram which schematically shows the construction of a microcomputer of the second embodiment of the present invention. In FIG. 5, like parts are designated by the same reference numerals to omit a duplicate explanation in view of the illustration of FIG. 1.

In FIG. 5, reference numeral 5 designates a parity adding unit for calculating a vertical parity of data at the time when the data is written in the data SRAM 2 and for writing the vertical parity thus obtained in the parity SRAM 3, 6 a total-sum changing unit for reading out a total sum S of data in the data SRAM 2, changing the total sum S, and writing a new value of the total sum in the total-sum storage 4, and 7 a parity error detector for detecting a parity error when data X and a parity thereof are read out from the data SRAM 2 and the parity SRAM 3, respectively.

Further, in the same way as the first embodiment, the CPU 1 in FIG. 5 can write data, etc. directly in each of the data SRAM 2, the parity SRAM 3 and the total-sum storage 4.

Next, an explanation will be made of the operation of the microcomputer of the second embodiment having the above-mentioned construction, with respect to the processing of data at addresses 0 to (n−1) of the associated block in the data SRAM 2 and the parity SRAM 3 as illustrated by the flow chart shown in FIG. 6.

First, initialization is performed, upon turning on of a power supply switch of the microcomputer or in accordance with the processing steps predetermined by the system concerned. An explanation of this initialization is omitted, since this initialization is performed in accordance with the routine such as illustrated in FIG. 2 with respect to the first embodiment.

Also in the second embodiment, an ordinary operation is performed when the initialization according to the routine shown in FIG. 2 is completed. In this second embodiment, like in the first embodiment, the execution of the error detection processing routine shown in FIG. 3 is started. As illustrated in FIG. 3, a content of an address i of an associated block in each of the data SRAM 2 and the parity SRAM 3 is read out by the CPU 1, and the content read out from the data SRAM 3 is set to X (step 17). In succession, a decision is made by the parity error detector 7 as to whether the read-out parity of the data X is erroneous (step 18). If it is decided that the read-out parity is not erroneous, the above X is retained as data, as it is, and the error detection processing comes to an end. On the other hand, if it is decided that the read-out parity is erroneous, the processings of the steps 19 to 23 are carried out to thereby perform the error correction processing like in the first embodiment. As a result, the CPU 1 can operate to detect object data at the address i which should be pursued by the error detection processing.

Figure 6:
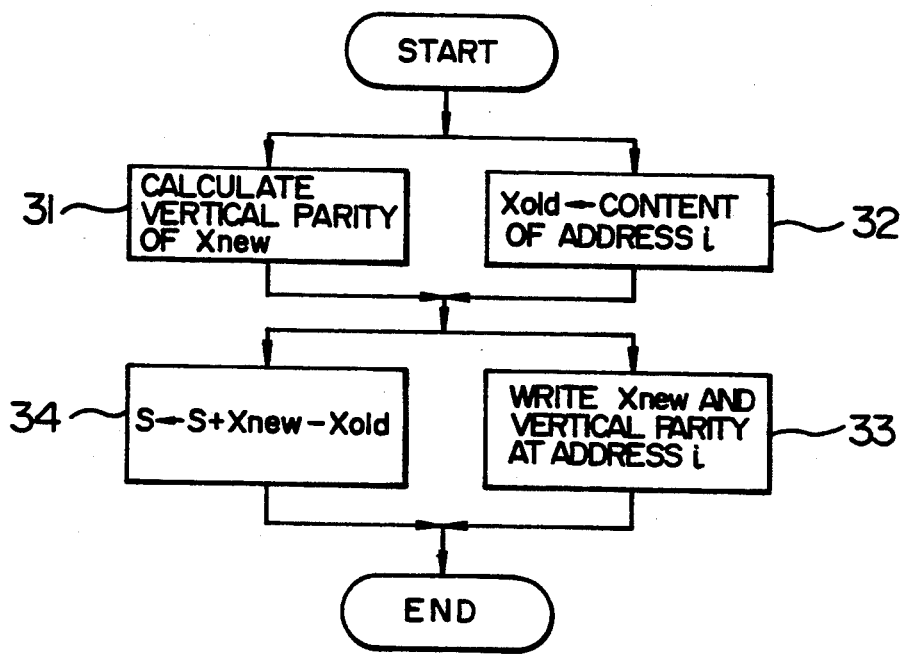
FIG. 6 shows a flow chart for explaining the operation of the microcomputer of the second embodiment.

In the second embodiment, after the above-described execution of the error detection processing routine has been completed, a data writing routine shown in FIG. 6 is executed.

In the first place, it is premised that data X has been written in at an address i in the data SRAM 2 by the CPU 1. Then, the data X and the address i are sent from the CPU 1 to the parity adding unit 5 and the total-sum changing unit 6, respectively. The parity adding unit 5 calculates a vertical parity of the data X (step 31). At the same time, the total-sum changing unit 6 reads out data at the address i in the data SRAM 2, and sets the read-out data to $X_{old}$ (step 32).

Then, the parity adding unit 5 writes data $X_{new}$ supplied from the CPU 1 at the address i in the data SRAM 2 and also writes a vertical parity of the data $X_{new}$ at the address i in the parity SRAM 3 (step 33). Simultaneously with the above-mentioned writing operation of the parity adding unit 5, the total-sum changing unit 6 reads out a total sum S from the total-sum storage 4, and performs a calculation based on a formula of $S + X_{new} - X_{old}$, and writes a result of this calculation in the total-sum storage 4 (step 34).

In the above-described execution of the data writing routine, the processings of the steps 31 and 32 are carried out in parallel, and the processings of the steps 33 and 34 are carried out in parallel. Thus, at the time when the data writing processing is carried out by the CPU 1, calculation of a parity, writing of the parity in the parity SRAM 3, and updating of a total sum S can be made at high speed.

As has been explained in the foregoing, according to the present invention, the CPU always stores a total sum of data in an associated block in a data SRAM. In a case where an error of a vertical parity is detected, data at all addresses of the associated block other than an address where the error has been detected are subtracted from the total sum of data stored in the CPU to detect and correct object data at the address where the error has been detected. Further, calculation of a renewed total sum of data stored in the CPU, at the time when any data in the associated block in the data SRAM is rewritten, can be attained only by adding a difference between new data and old data to an old total sum before the rewriting is made, that is, updating of a total sum can be made at high speed.

Further, it is possible to perform the above calculation without using software, but by using hardware including suitable electronic circuits. In this case, it is possible to have various advantages such as a reduction in the number of programs to be used, and the like.

I claim:
1. A microcomputer comprising:
a data SRAM for storing data and outputting stored data;
a parity SRAM, coupled to the data SRAM for storing a parity associated with each of the data stored in the data SRAM and for outputting the stored parity;
a total-sum storage, coupled to the data SRAM, for storing a total sum of data associated with a block of stored data in the SRAM and for outputting the stored total sum of data; and
a CPU for controlling the data SRAM, the parity SRAM and the total-sum storage, the CPU providing
a summing function for calculating the total-sum of data associated with the block of stored data;
a total-sum changing function for calculating a new total sum of data $S_{new}$ associated with the block of stored data when new data $X_{new}$ is stored in the block of stored data, the new total sum of data $S_{new}$ being based on an equation

$$S_{new} = S_{old} + X_{new} - X_{old},$$

where, $X_{new}$ denotes new data after new data has been stored, the block of stored data replacing old data $X_{old}$, and
$S_{old}$ denotes an old total sum of data associated with the block of stored data before the new data is stored in the block of stored data;
a parity adding function for calculating a vertical parity associated with the new data when the new data is stored in the data SRAM and for storing the vertical parity in the parity SRAM;
a parity error detecting function for detecting an error in the vertical parity of data associated with the old data $X_{old}$ output from the parity SRAM when the old data $X_{old}$ is output from the data SRAM, and for producing an error indication when an error is detected in the output vertical parity; and
an error correction function for calculating and correcting data stored at the address where the error has been detected by subtracting data stored at all addresses of the block of stored data other than the data stored at the address where the error has been detected from the new total sum of data $S_{new}$ associated with the block of stored data.

2. A microcomputer comprising:

a data SRAM for storing data and outputting stored data;

a parity SRAM, coupled to the data SRAM, for storing a parity associated with each of the data stored in the data SRAM and for outputting the stored parity;

a total-sum storage, coupled to the data SRAM, for storing a total sum of data associated with a block of stored data in the SRAM and for outputting the stored total sum of data;

a CPU for controlling the data SRAM, the parity SRAM and the total-sum storage;

a total-sum changing unit, coupled to the SRAM, for changing the total sum of data associated with the block of stored data when data in the block of stored data and the associated parity in the parity SRAM are rewritten by the CPU, the total-sum changing unit calculating a new total sum of data $S_{new}$ associated with the block of stored data based on an equation $$S_{new}=S_{old}+X_{new}-X_{old},$$

where, $X_{new}$ denotes new data stored in the block of stored data, $X_{old}$ denotes old data stored in the block of stored data, and $S_{old}$ denotes an old total sum of data associated with the block of stored data before the new data $X_{new}$ is stored in the block of stored data;

a parity adding unit, coupled to the SRAM and the parity SRAM, for calculating a vertical parity of data when data are stored in the data SRAM by the CPU, and for storing the calculated vertical parity in the parity SRAM; and a parity error detector, coupled to the parity SRAM, for detecting a vertical parity error of a vertical parity output from the parity SRAM when data are output from the data SRAM, and, when an error is detected in the output vertical parity, for outputting an address of the data where the error has been detected and for producing an error indication;

the CPU having a summing function for calculating a total sum of data associated with the block of stored data and an error correcting function for calculating and correcting data at the address where the error has been detected by subtracting stored data at all addresses of the block of stored data other than the stored data at the address where the error has been detected from the new total sum of data $S_{new}$ associated with the block of stored data.

* * * * *

UNITED STATES PATENT AND TRADEMARK OFFICE
CERTIFICATE OF CORRECTION

PATENT NO. : 5,404,495
DATED : April 4, 1995
INVENTOR(S) : Hiroshi YONEDA

It is certified that error appears in the above-indentified patent and that said Letters Patent is hereby corrected as shown below:

On Title Page:

[30] Foreign Application Priority Data
November 20, 1990 [JP] ............ 2-317292

Signed and Sealed this

Eighteenth Day of July, 1995

Attest:

BRUCE LEHMAN

*Attesting Officer*    *Commissioner of Patents and Trademarks*